Nov. 28, 1961 D. C. UDY 3,010,666
GRINDER AND MIXER ADAPTED FOR TESTING
PROTEIN CONTENT OF GRAINS
Filed Oct. 26, 1959 2 Sheets-Sheet 1
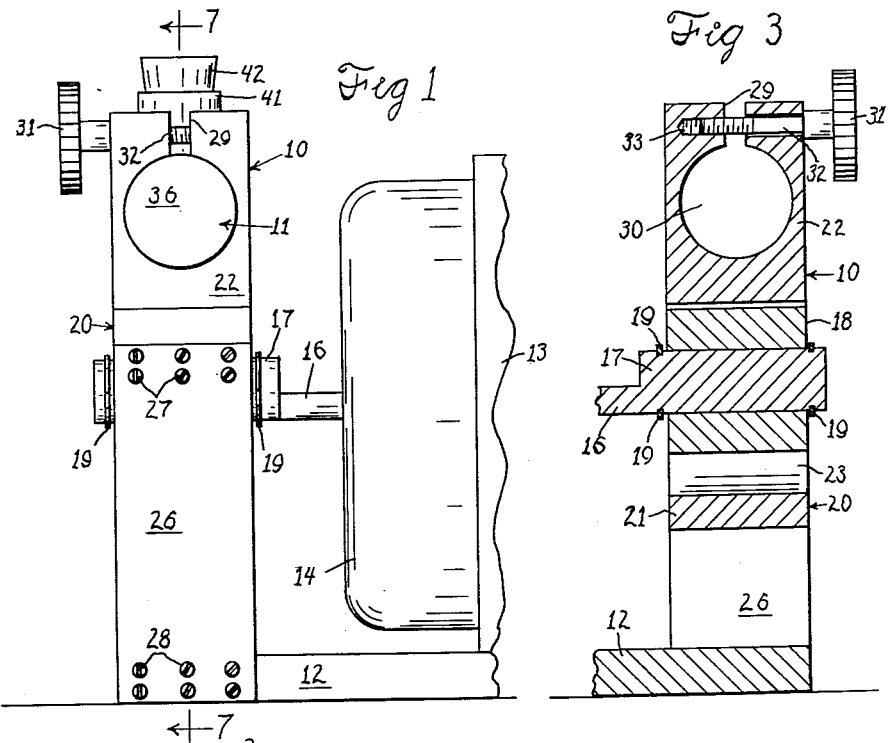
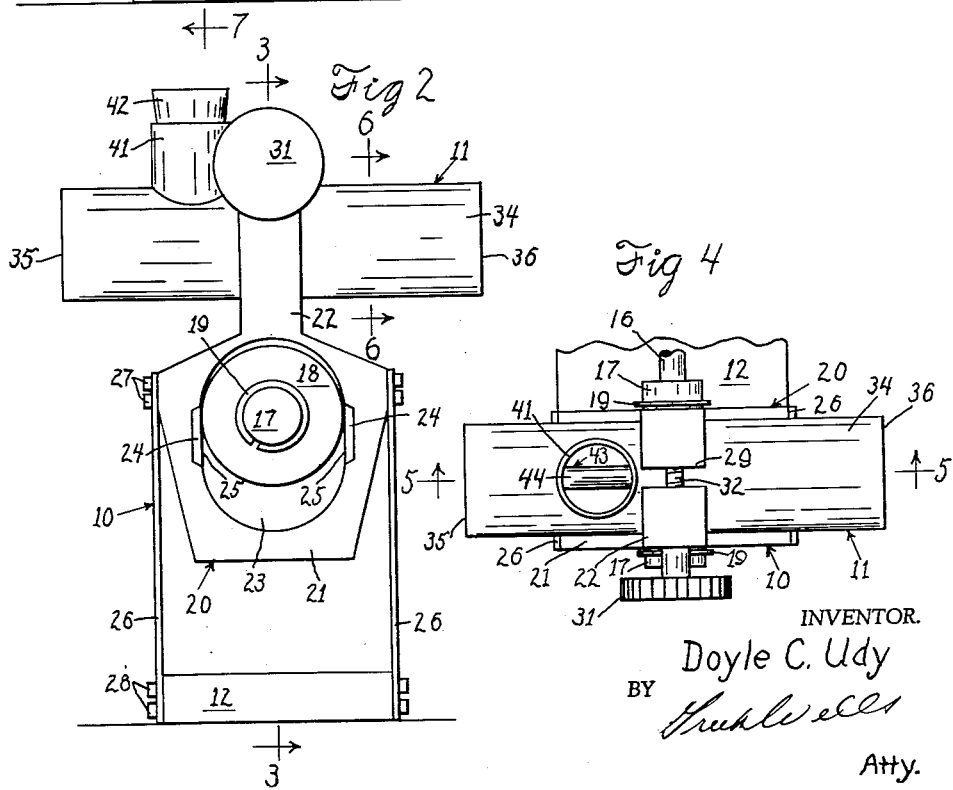
INVENTOR.
Doyle C. Udy
BY
Atty.

Nov. 28, 1961 D. C. UDY 3,010,666
GRINDER AND MIXER ADAPTED FOR TESTING
PROTEIN CONTENT OF GRAINS
Filed Oct. 26, 1959 2 Sheets-Sheet 2
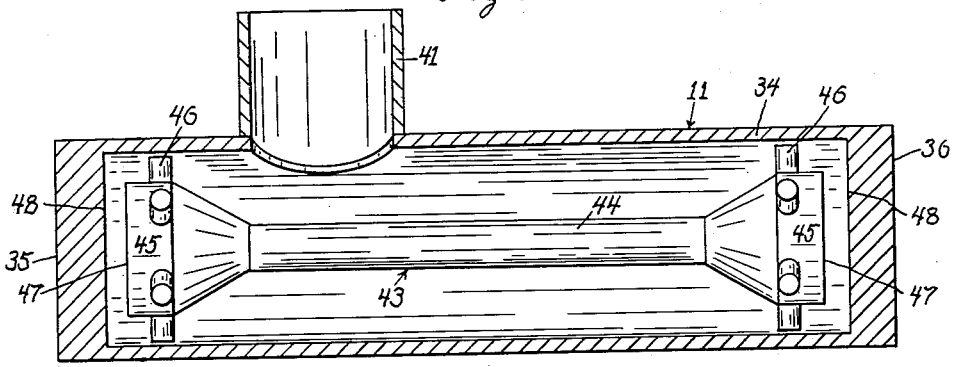
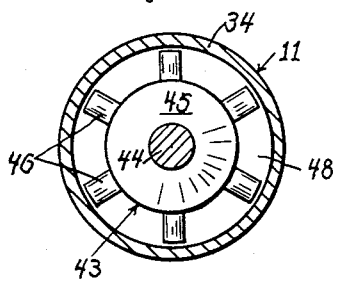
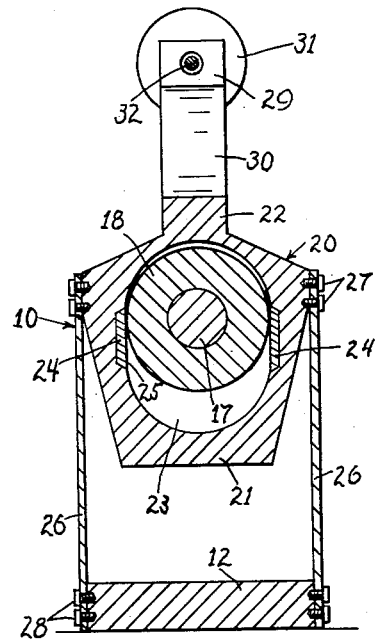
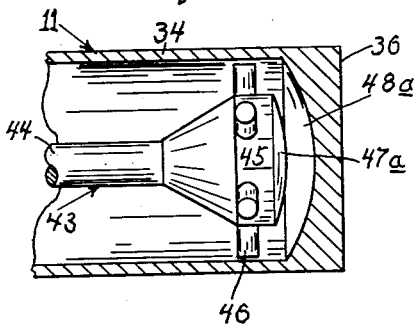
INVENTOR.
Doyle C. Udy
BY
Atty.

United States Patent Office 3,010,666
Patented Nov. 28, 1961

3,010,666
GRINDER AND MIXER ADAPTED FOR TESTING
PROTEIN CONTENT OF GRAINS
Doyle C. Udy, 2205 Orchard Ave., Pullman, Wash.
Filed Oct. 26, 1959, Ser. No. 848,718
5 Claims. (Cl. 241—170)

This application relates to an improved grinder and mixer which is adapted for use in protein content testing of grains and for other purposes where quick fine grinding of a substantial sample is needed.

To determine the protein content of grain, a test has been devised using a dye which reacts and precipitates when brought into contact with protein. In order to obtain accurate results, the grain must be ground to a fine flour-like condition and must be thoroughly mixed with the dye. The device disclosed herein is adapted to accomplish both of these steps in a fast, easily controlled process.

It is an object of this invention to provide a grinding and mixing machine utilizing pure oscillating motion so as to avoid vertical vibration.

It is another object of this invention to provide such a machine which requires no complicated closure.

It is another object of this invention to provide such a machine which is easily controlled to provide accurate and dependable comparative testing.

These and further objects will become evident from the following detailed description and the accompanying drawings. The embodiment specifically disclosed is illustrative only and is not intended to limit the scope of invention except as defined in the claims.

In the drawings:

FIGURE 1 shows a front elevational view of the invention with the motor partly broken away;

FIGURE 2 shows a side elevational view of the invention, the motor being deleted for clarity;

FIGURE 3 shows a sectional view taken along line 3—3 in FIGURE 2;

FIGURE 4 shows a top plan view of the invention with the motor shaft and base broken away for clarity;

FIGURE 5 shows a sectional view of the capsule taken along line 5—5 in FIGURE 4;

FIGURE 6 shows a sectional view of the capsule taken along line 6—6 in FIGURE 2;

FIGURE 7 shows a sectional view of the motion converter taken along line 7—7 in FIGURE 1; and FIGURE 8 shows a partial sectional view similar to FIGURE 5 illustrating a second form of the invention.

Referring now to the drawings, there is shown one preferred embodiment of the novel mixer and grinder. It consists of two essential parts, the motion converter 10 and the capsule 11. The motion converter 10 is fixed to a solid base 12 adapted to be secured to a bench or table by means of clamps or bolts (not shown). Base 12 has fixedly attached thereto, a motor mount 13 which provides a mounting for an electric motor 14 which is bolted to base 12 by means not shown. The driven shaft 16 of motor 14 has formed thereon an eccentric portion 17 at its outer end. The eccentric portion 17 of shaft 16 has mounted upon it a rotatable bearing 18 which is secured to portion 17 by lock washers 19 to restrict longitudinal movement of bearing 18 while allowing free rotation movement.

Bearing 18 is mounted within a frame 20 which has a generally pentagonal cross section shape at its lower portion 21 with an upstanding integral arm 22. The portion 21 has an aperture 23 cut into it which receives bearing 18. The aperture 23 is oval in shape having vertical straight sides slightly greater in length than twice the eccentricity between shaft 16 and eccentric portion 17. The two rounded ends of aperture 23 have a diameter only slightly greater than the outside diameter of bearing 18, the difference being just sufficient to allow clearance for free sliding motion. Inserts 24 are provided on the vertical sides of aperture 23 and have a flat surface 25 of a hard metal material. Contact of bearing 18 is therefore limited to these inserts to insure close sliding motion without undue wear.

Frame 20 is elevated above base 12 by means of two spring supports 26 which are securely attached to frame 20 by screws 27 and to base 12 by screws 28. Spring supports 26 are made of flexible spring material so as to allow oscillatory motion of frame 20 but will prevent any vertical motion or vibration.

Arm 22 of frame 20 is split at 29 and has a generally circular opening 30 which serves as a clamp. The split portion 29 is closed by a knob 31 mounted upon a screw 32 threadably engaged in threaded hole 33 which extends through arm 22.

The capsule 11 has a cylindrical body 34 with two integral closed ends 35, 36. The ends 35, 36 and body 34 are made of an inert metal such as nickel and are welded to form a solid assembly. Mounted at a right angle to cylindrical body 34 intermediate its ends is a cylindrical spout 41 which is closed by a removable stopper 42 made of plastic or rubber.

As can be seen in FIGURES 1 and 2, capsule 11 is mounted upon frame 20 so as to receive endwise oscillatory motion from motor 14. Capsule 11 is securely fixed to frame 20 within opening 30 by closing split portion 29 by means of hand piece 31 and screw 32.

The interior of capsule 11 is shown in FIGURES 5 and 6. Capsule 11 houses a free moving dumbbell 43 which is inserted before attaching end 35. Dumbbell 43 has a small cylindrical body 44 terminating in two enlarged ends 45 which have a plurality of radial fingers 46 made of Teflon or nylon that slide upon the interior of body 34 and support the free dumbbell 43. Dumbbell 43 is shorter than body 34 and slides back and forth within the interior of the cylinder in response to the oscillating movement of arm 22 due to the dumbbell's relatively high inertia. In FIGURE 5 the end faces 47 of dumbbell 43 and surfaces 48 of ends 35, 36 are shown as being flat. In FIGURE 8 is shown a view of the interior of a second embodiment wherein surfaces 47a are convex and surfaces 48a are of a corresponding concave configuration. In each embodiment it is essential that the outer ends of the dumbbell be in close proximity to the ends of the cylindrical body as shown, so as to allow the necessary grinding action of solid particles in the body when partially filled with liquid.

In operation, motor 14 turns shaft 16 and causes portion 17 to move eccentrically about its center of rotation. This imparts the eccentric movement to bearing 18 which is not positively rotated, but can turn or slide upon inserts 24. This sliding motion of bearing 18 absorbs the vertical movement of eccentric 17 due to the free vertical movement within aperture 23, but transmits the radial oscillatory movement to frame 20 which carries capsule 11.

Before motor 14 is energized, a measured amount of grain to be tested is inserted through spout 41, along with a measured amount of a dye having the characteristic of reacting with grain protein to form various color shades. Stopper 42 is inserted and the motor 14 is energized for a predetermined duration of time.

During oscillation of frame 20, capsule 11 is moved endwise. This causes reciprocating movement of dumbbell 43 which crushes any grain caught between surfaces 47 and 48. It also insures close affinity between the crushed grain and the dye to aid in the reaction process. As the dumbbell reciprocates, it circulates the mixture which flows between fingers 46 to assure a constant crushing and mixing of the particles with each movement. This results in a uniform mixture having a color concentration indicative of the grain's protein content. The motor 14 is then stopped by a timer (not shown) or manually and the contents of capsule 11 are filtered. The liquid's color intensity is then compared optically with a standard chart to determine the protein content. The capsule 11 need not be cleaned, since the large center spout 41 drains almost completely between tests.

It can thus be seen that uniform tests results are quickly obtained by use of this machine, which is easily operated by technicians with little chance of error.

The foregoing species are not exhaustive and are not intended to limit the invention except as it is limited by the annexed claims.

Having thus described my invention, I claim:

1. In a grinder and mixer for testing grain, a capsule comprising a hollow cylindrical body closed at each end, a closable opening located upon said cylindrical body, a dumbbell within said capsule, said dumbbell having a narrow central portion and two enlarged ends, the total length of said dumbbell being slightly less than the inner length of said capsule, the terminal diameter of said dumbbell being less than the inner diameter of said capsule and radial support means adapted to axially position said dumbbell within and in spaced relation to said capsule for sliding motion therein.

2. The invention defined in claim 1 wherein said support means comprises fingers on the dumbbell extending outwardly substantially to the cylindrical body and spaced apart about the dumbbell.

3. The invention defined in claim 1 wherein the support means comprises rows of radial fingers on the enlarged ends of the dumbbell, the fingers in each row being spaced apart circumferentially of the enlarged ends.

4. In a grinder and mixer for testing grain, the combination with a prime mover, a motion converter operatively connected to said prime mover to be driven thereby, said motion converter being adapted to convert rotary motion to oscillatory motion, and clamp means operatively connected to the output of said motion converter, of a closed capsule held by said clamp means, double ended dumbbell means located within said capsule and including end surfaces in close proximity to the two ends of the capsule adapted to engage the inner end surfaces of the capsule, said dumbbell means being mounted for free longitudinal motion with respect to said capsule, and a closable opening located upon said capsule intermediate the ends thereof.

5. In a grinder and mixer, a capsule comprising a hollow cylindrical body having two closed ends, a dumbbell within said body having a length less than the inner distance between said closed ends, the two axial ends of said dumbbell having a surface configuration complementary to the inner surface configuration of said closed ends and being in proximity thereto, said axial ends having a diameter less than the inner diameter of said cylindrical body, spaced apart support members located on said dumbbell extending radially therefrom toward said cylindrical body adapted to position the dumbbell within said cylindrical body, a closable opening located on said cylindrical body intermediate its ends, and oscillating means adapted to carry said capsule so as to oscillate it longitudinally with respect to said cylindrical body.

References Cited in the file of this patent

UNITED STATES PATENTS

| | | |
|---|---|---|
| 742,017 | Fitzhugh | Oct. 20, 1903 |
| 1,207,703 | Basehore et al. | Dec. 12, 1916 |
| 1,356,731 | Muchow | Oct. 26, 1920 |
| 2,143,610 | Muller | Jan. 10, 1939 |
| 2,151,123 | Lavine | Mar. 21, 1939 |
| 2,286,600 | Chott | June 16, 1942 |
| 2,527,992 | Greenberg | Oct. 31, 1950 |
| 2,541,043 | Curry | Feb. 13, 1951 |
| 2,668,668 | Doschek | Feb. 9, 1954 |
| 2,789,799 | Kaufman | Apr. 23, 1957 |

FOREIGN PATENTS

| | | |
|---|---|---|
| 408,683 | Germany | Jan. 24, 1925 |